United States Patent Office 3,296,251
Patented Jan. 3, 1967

---

3,296,251
3-MERCAPTO AND 3-SUBSTITUTED MERCAPTO-1,3-DIHYDRO-2H-1,4-BENZODIAZEPIN-2-ONES
Stanley C. Bell, Philadelphia, Peter H. L. Wei, Upper Darby, and Carl Gochman, Philadelphia, Pa., assignors to American Home Products Corporation, New York, N.Y., a corporation of Delaware
No Drawing. Filed Feb. 26, 1963, Ser. No. 261,229
4 Claims. (Cl. 260—239.3)

This invention is concerned with novel chemical compounds having useful pharmacodynamic activity and with a process for making the same. The compounds of this invention are organic bases and their pharmaceutically acceptable acid salts.

More particularly, this invention relates to 3-mercapto and 3-substituted mercapto-1,3-dihydro-2H-1,4-benzodiazepin-2-ones, which, as bases, are represented by the following formula:

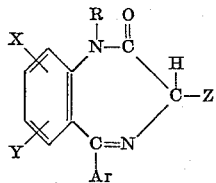

I wherein X and Y each represent hydrogen, chlorine, fluorine, nitro, methylsulfonyl, methoxy, methyl or trifluoromethyl; R is hydrogen, lower alkyl (methyl, ethyl, or propyl), lower alkenyl (allyl or methallyl) or lower aralkyl (benzyl or phenethyl): Ar is phenyl pyridyl, furyl, thienyl or phenyl substituted by chlorine, fluorine, methoxy, methyl or trifluoromethyl and Z is a mercapto radical. In the above formula, Z may be an unsubstituted mercapto radical or a lower alkyl mercapto radical, a di(lower alkyl)aminoalkylmercapto radical, an aryl mercapto radical, an aralkyl mercapto radical, a heterocyclic alkyl mercapto radical such as 2-morpholinoethyl mercapto, 3-piperidinopropyl mercapto or 2-pyrrolidinoethyl mercapto. The present invention also covers nontoxic acid salts of the above defined compounds with acids such as hydrochloric, sulfuric, phosphoric, maleic, succinic, fumaric and citric acids.

The starting compounds for this invention are 3-halo-1,3-dihydro-5-phenyl-2H-1,4-benbodiazepin-2-ones which are prepared as disclosed in co-pending application Ser. No. 177,174 filed March 5, 1962, and now abandoned. These compounds have the following formula:

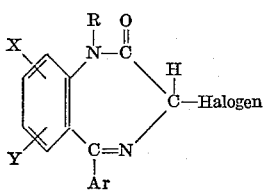

II wherein X, Y, R and Ar are as stated for Formula I.

A halogen atom at position 3 in compounds of Formula II is very active and accordingly these compounds react at room temperature with mercapto compounds such as thiourea, thioacetamide, KSH, NaSH and the like to produce compounds of Formula I. The reaction is preferably carried out in a solvent, such as dimethoxy-ethane or benzene.

The following examples in which all temperatures are in degrees centigrade illustrate the best mode of carrying out the present invention.

*Example 1*

To a solution of 3.0 g of 3,7-dichloro-1,3-dihydro-5-phenyl-2H-1,4-benzodiazepin-2-one in 50 ml. of dimethoxy-ethane was added 3.0 g. of thiourea with stirring. After stirring for 1 hour, the reaction mixture was diluted with 100 ml. of water, filtered from impurities, and made alkaline with sodium hydroxide. The solution was filtered from impurities, acidified with acetic acid and the product collected. Recrystallization from alcohol-water and then ethyl acetate-cyclohexane gave 7-chloro-1,3-dihydro - 5-phenyl-3-mercapto-2H-1,4-benzodiazepin-2-one, M.P. 179–180.

*Example 2*

7 - chloro-1,3-dihydro-5-phenyl-3-mercapto-2H-1,4-benzodiazepin-2-one was also prepared by substituting thioacetamide for thiourea in Example 1.

*Example 3*

To a mixture of 12.7 g. of diethylaminoethanethiol hydrochloride and 10.0 g. of triethylamine in benzene was gradually added with stirring and cooling 7.6 g. of 3,7-dichloro - 1,3 - dihydro-5-phenyl-2H-1,4-benzodiazepin-2-one. After stirring for 3 hours, the reaction mixture was filtered from impurities, washed with water and evaporated in vacuo to dryness. The residue was washed with petroleum ether and converted to the hydrochloride salt in benzene. Recrystallization from ethanol gave 7-chloro-3 - (2 - diethylaminoethylmercapto)-1,3-dihydro-5-phenyl-2H-1,4-benzodiazepin-2-one hydrochloride, M.P. 260° dec.

When the following reactants are treated by the process steps of the foregoing examples, the corresponding products hereinafter disclosed are obtained:

| Reactants | Products |
|---|---|
| 3,7-dichloro-1,3-dihydro-1-methyl-5-(p-chlorophenyl)-2H-1,4-benzodiazepine-2-one and thiophenol. | 7-chloro-1,3-dihydro-1-methyl-3-phenylmercapto-5-(p-chlorophenyl)-2H-1,4-benzodiazepin-2-one. |
| 1-allyl-3-chloro-7-nitro-5-(2-thienyl)-1,3-dihydro-2H-1,4-benzodiazepin-2-one and benzyl mercaptan. | 1-allyl-3-benzylmercapto-7-nitro-5-(2-thienyl)-1,3-dihydro-2H-1,4-benzodiazepin-2-one. |
| 1-benzyl-3-chloro-7-methyl-5-(m-fluorophenyl)-1,3-dihydro-2H-1,4-benzodiazepin-2-one and ethyl mercaptan. | 1-benzyl-3-ethylmercapto-7-methyl-5-(m-fluorophenyl)-1,3-dihydro-2H-1,4-benzodiazepin-2-one. |
| 3-chloro-1,3-dihydro-7-trifluoromethyl-5-(o-tolyl)-2H-1,4-benzodiazepin-2-one and mercaptobenzothiazole. | 1,3-dihydro-3-benzothiazolylmercapto-5-(o-tolyl)-7-trifluoromethyl-2H-1,4-benzodiazepin-2-one. |
| 3-chloro-5-(p-trifluoromethylphenyl)-1,3-dihydro-2H-1,4-benzodiazepin-2-one and 2-morpholinoethyl mercaptan. | 3-(2-morpholinoethylmercapto)-5-(p-trifluoromethylphenyl)-1,3-dihydro-2H-1,4-benzodiazepin-2-one. |
| 3-chloro-1,3-dihydro-7-methylsulfonyl-5-(p-methoxyphenyl)-2H-1,4-benzodiazepin-2-one and 3-piperidinopropyl mercaptan. | 1,3-dihydro-7-methylsulfonyl-5-(p-methoxyphenyl)-3-(3-piperidinopropyl mercapto)-2H-1,4-benzodiazepin-2-one. |
| 3,7,9-trichloro-1,3-dihydro-5-phenyl-2H-1,4-benzodiazepin-2-one and 2-pyrrolidinoethyl mercaptan. | 7,9-dichloro-1,3-dihydro-5-phenyl-3-(2-pyrrolidinoethylmercapto)-2H-1,4-benzodiazepin-2-one. |
| 3,7-dichloro-1,3-dihydro-5-(2-pyridyl)-2H-1,4-benzodiazepin-2-one and 2-diethylaminoethanethiol. | 7-chloro-3-(2-diethyl-aminoethylmercapto)-1,3-dihydro-5-(2-pyridyl)-2H-1,4-benzodiazepin-2-one. |
| 3,7-dichloro-1,3-dihydro-5-(2-furyl)-2H-1,4-benzodiazepin-2-one and 3-dimethylaminopropanethiol. | 7-chloro-1,3-dihydro-3-(3-dimethylaminopropylmercapto)-5-(2-furyl)-2H-1,4-benzodiazepin-2-one. |

The compounds of this invention have anti-convulsant, and potent anti-tremorine activities. They can be administered in a wide variety of oral or parenteral unit dosage forms, singly, or in admixture with other active compounds.

The present invention therefore also includes the process of bringing the compounds thereof into a form suitable for therapeutic administration by associating them with liquid or solid, pharmaceutically acceptable carriers.

What is claimed is:

1. A compound selected from the class consisting of 3-mercapto - 1,3-dihydro-5-aryl-2H-1,4-benzodiazepin-2-one wherein aryl is selected from the group consisting of phenyl, pyridyl, furyl, thienyl, and phenyl substituted by chlorine, fluorine, methoxy, methyl, and trifluoromethyl and the pharmaceutically acceptable acid addition salts thereof.

2. A compound selected from the class consisting of 3-substituted - mercapto-1,3-dihydro-5-aryl-2H-1,4-benzodiazepin-2-ones wherein aryl is selected from the group consisting of phenyl, pyridyl, furyl, thienyl, and phenyl substituted by chlorine, fluorine, methoxy, methyl, and trifluoromethyl and in which the 3-substituent is selected from the group consisting of lower-alkylmercapto, di-lower-alkylamino-lower alkylmercapto, phenylmercapto and benzylmercapto and the pharmaceutically acceptable acid addition salts thereof.

3. 7 - chloro - 1,3-dihydro-5-phenyl-3-mercapto-2H-1,4-benzodiazepin-2-one.

4. 7-chloro-3-(2-diethylaminoethylmercapto)-1,3-dihydro-5-phenyl-2H-1,4-benzodiazepin-2-one.

References Cited by the Examiner

Bell et al.: J. Org. Chem., vol. 27, pp. 1691–5 (1962).
Patent Journal, Republic of South Africa, vol. 1, page 30 (1961) For. Pat. JR1.
Wagner et al.: Synthetic Organic Chemistry (New York, 1953), pp. 787–788.

ALEX MAZEL, *Primary Examiner.*

NICHOLAS S. RIZZO, *Examiner.*

A. D. ROLLINS, *Assistant Examiner.*